US011861422B2

(12) United States Patent
Zhang et al.

(10) Patent No.: US 11,861,422 B2
(45) Date of Patent: Jan. 2, 2024

(54) METHOD AND SYSTEM FOR ENABLING COMMUNICATION BETWEEN MULTIPLE VIRTUAL PLATFORMS

(71) Applicant: Nordic Semiconductor ASA, Trondheim (NO)

(72) Inventors: Ziang Zhang, Trondheim (NO); Michael Davis, Trondheim (NO); Christopher Smith, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 22 days.

(21) Appl. No.: 17/535,230

(22) Filed: Nov. 24, 2021

(65) Prior Publication Data

US 2022/0164243 A1   May 26, 2022

(30) Foreign Application Priority Data

Nov. 25, 2020 (GB) ...................................... 2018547

(51) Int. Cl.
*G06F 13/10* (2006.01)
*G06F 9/54* (2006.01)
(Continued)

(52) U.S. Cl.
CPC .............. *G06F 9/544* (2013.01); *G06F 9/455* (2013.01); *G06F 12/023* (2013.01); *G06F 2212/152* (2013.01)

(58) Field of Classification Search
CPC ........ G06F 9/544; G06F 9/455; G06F 12/023; G06F 2212/152; G06F 2009/45591;
(Continued)

(56) References Cited

U.S. PATENT DOCUMENTS 10,303,879 B1 * 5/2019 Potlapally ............... G06F 21/57
10,339,229 B1    7/2019 Wilmot et al.
(Continued)

FOREIGN PATENT DOCUMENTS

CN         1928877 A    3/2007
CN       103541708 A    1/2014
(Continued)

OTHER PUBLICATIONS

Grob et al., "Concept of a Versatile HF Transmission System and Its Embedding Into Simulation Environments," *2000 8th International Conference on HF Radio Systems and Techniques*, Jul. 2000, 4 pages.
(Continued)

*Primary Examiner* — Kevin L Young
*Assistant Examiner* — Abdou K Seye
(74) *Attorney, Agent, or Firm* — Klarquist Sparkman, LLP

(57) ABSTRACT

A computer system configured to enable communication between two or more virtual platforms is disclosed. The computer system comprises a physical processor configured to run the two or more virtual platforms. The computer system further comprises a memory. The memory comprises one or more separate memory portions allocated to each of the two or more virtual platforms, wherein within at least one memory portion allocated to one of the virtual platform a predefined range of addresses is configured as a shared device memory, the shared device memory being accessible by all the virtual platforms. Firmware running on a first virtual platform is configured to transfer a data packet from the first virtual platform to one or more further virtual platforms via the shared device memory.

23 Claims, 7 Drawing Sheets

(51) Int. Cl.
*G06F 9/455* (2018.01)
*G06F 12/02* (2006.01)

(58) Field of Classification Search
CPC ............. G06F 9/45558; G06F 11/3632; G06F 11/3636; G06F 11/3652; G06F 11/3664; G06F 11/36
See application file for complete search history.

(56) References Cited

U.S. PATENT DOCUMENTS

| | | |
|---|---|---|
| 10,691,580 B1* | 6/2020 | Kasat .................... G06F 11/364 |
| 2002/0101824 A1 | 8/2002 | Ziedman |
| 2005/0256694 A1 | 11/2005 | Taylor |
| 2006/0047496 A1 | 3/2006 | Genkin et al. |
| 2006/0248526 A1* | 11/2006 | Rostampour ....... G06F 9/45504 718/1 |
| 2008/0005297 A1* | 1/2008 | Kjos ....................... H04L 67/08 709/223 |
| 2009/0307299 A1 | 12/2009 | Malesich et al. |
| 2013/0188509 A1 | 7/2013 | Mellein et al. |
| 2014/0180662 A1 | 6/2014 | Saether |
| 2016/0314076 A1* | 10/2016 | Wibling ................. G06F 12/109 |
| 2019/0107965 A1 | 4/2019 | Deval et al. |
| 2021/0064525 A1* | 3/2021 | Tian .................... G06F 12/1081 |

FOREIGN PATENT DOCUMENTS

| | | |
|---|---|---|
| CN | 105824729 A | 8/2016 |
| DE | 102010046095 A1 | 3/2012 |
| EP | 1 259 054 A2 | 11/2002 |
| EP | 1 434 386 A2 | 6/2004 |

OTHER PUBLICATIONS

IPO Combined Search and Examination Report under Sections 17 and 18(3) for GB2018547.6, dated Sep. 1, 2021, 10 pages.

Pagano et al., "A Framework for Modeling Operating System Mechanisms in the Simulation of Network Protocols for Real-Time Distributed Systems," *2007 IEEE International Parallel and Distributed Processing Symposium*, Mar. 2007, 8 pages.

* cited by examiner

METHOD AND SYSTEM FOR ENABLING COMMUNICATION BETWEEN MULTIPLE VIRTUAL PLATFORMS

CROSS-REFERENCE TO RELATED APPLICATION

This application claims priority to United Kingdom Patent Application No. GB2018547.6, filed Nov. 25, 2020, which application is incorporated by reference herein in its entirety.

BACKGROUND

Over the years, electronic systems have become significantly more complex. Even simple designs of electronic devices include multiple processors, a mixture of CPU types, digital signal processing (DSP), application-specific integrated circuits (ASICs), communication systems, and other devices. With the diverse combinations of hardware, these electronic systems employ a variety of operating systems and applications that until recently would not have been combined within a single product or solution.

However, as these electronic systems have grown in their complexity, the development tools, and processes for developing and testing electronic devices have not kept pace. A fundamental part of development is testing what is built. Whether a piece of software will run or not cannot be identified until you have seen it running. As a result, system developers are challenged to find new ways to define system architectures, develop and integrate millions of lines of code, and deploy such complex systems. These processes need to be done in ways that are faster and reduce risk while simultaneously resulting in a higher-quality product that is easier to support and maintain.

Certain devices such as field-programmable gate arrays (FPGAs) are used for automating the testing of electronic devices. However, these devices are quite expensive and do not have enough debugging capabilities. Thus, system developers are faced with significant challenges such as develop, debug, and maintain ever more complex systems. Virtual platforms are used in addressing these challenges. Though virtual platforms can be used for testing and debugging system architectures, there are still challenges when a virtual platform is made to communicate with other virtual platforms for testing the systems.

The embodiments described below are not limited to implementations which solve any or all of the disadvantages of known methods of testing and debugging system using virtual platforms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computer system configured to enable communication between two or more virtual platforms is disclosed. The computer system comprises a physical processor configured to run the two or more virtual platforms. The computer system further comprises a memory. The memory comprises one or more separate memory portions allocated to each of the two or more virtual platforms, wherein within at least one memory portion allocated to one of the virtual platform a predefined range of addresses is configured as a shared device memory, the shared device memory being accessible by all the virtual platforms. Firmware running on a first virtual platform is configured to transfer a data packet from the first virtual platform to one or more further virtual platforms via the shared device memory.

According to a first aspect there is provided a computer system configured to enable communication between two or more virtual platforms. The computer system comprises a physical processor configured to run the two or more virtual platforms. The physical processor executes for each virtual platform: a processor simulator, a simulated communication device and an interface. The processor simulator is configured to simulate a virtual processor. The virtual processor runs a device driver. The simulated communication device is configured to run firmware, the firmware initiates communication between its corresponding virtual platform and at least one other virtual platform. The interface is connecting the processor simulator with the simulated communication device such that the simulated virtual processor interacts with the simulated communication device. The computer system further comprises a memory. The memory comprises one or more separate memory portions allocated to each of the two or more virtual platforms, wherein within at least one memory portion allocated to one of the virtual platform a predefined range of addresses is configured as a shared device memory, the shared device memory being accessible by all the virtual platforms. The firmware running on a first virtual platform is configured to transfer a data packet from the first virtual platform to one or more further virtual platforms via the shared device memory.

Optionally, the firmware transfers the data packet by copying the data packet from a memory portion allocated to the corresponding simulated communication device to the shared device memory.

Optionally, the first virtual platform further indicates the transfer of data packets to the one or more virtual platforms by writing a value into the shared device memory.

Optionally, the virtual processor and the simulated communication device of each virtual platform are allocated to separate memory portions in the memory.

Optionally, the shared device memory is configured as the predefined range of addresses of a memory portion allocated to a simulated communication device of one of the virtual platforms.

Optionally, the shared device memory comprises a data portion and a register portion. The data portion is visible to the two or more virtual platforms. The register portion represents a plurality of registers, wherein each virtual platform is allocated one or more registers in the register portion.

Optionally, the firmware running on the simulated communication device transfers the data packet by copying the data packet into the data portion in the shared device memory.

Optionally, the simulated communication device indicates the transfer of the data packet by writing into a register in the register portion allocated to each of the corresponding one or more virtual platforms to which data packet is transferred.

Optionally, each virtual platform among the two or more virtual platforms checks the allocated registers in the register portion in each simulated clock cycle, raises an interrupt on the corresponding virtual platform, when a value is written in the allocated register, reads the data packet from the shared device memory and acknowledges the interrupt by writing into another register in the register portion, allocated to the corresponding virtual platform.

Optionally, the firmware running on the simulated communication devices of the one or more virtual platforms reads the data packet from the shared device memory on receiving the interrupt.

Optionally, the simulated communication device may comprise a simulated processor running the firmware.

Optionally, the interrupt is raised to and acknowledged by the simulated processor in the simulated communication device.

Optionally, the device driver drives the firmware in the simulated communication device to initiate the communication.

Optionally, the device driver interacts with and controls a transmitter and/or a receiver driver module.

Optionally, the simulated communication device further transfers an output to a debugger. The debugger, on receiving the output, analyses the output to verify if the communication between the two or more virtual platforms was successful and outputs a corresponding indication.

Optionally, the simulated communication device is the simulation of a hardware communication device comprising at least one of Wi-Fi®, Bluetooth®, and wired ethernet.

Optionally, the simulated communication device is a simulation of dedicated hardware of a communication device running a plurality of layers of a communication protocol model on a simulated processor.

Optionally, the transfer of data packets is initiated at a lower MAC layer in the communication protocol model of the simulated communication device.

According to a second aspect there is provided a computer-implemented method of enabling communication between two or more virtual platforms running on a physical processor of a computer system. The physical processor executes for each virtual platform a virtual processor and a simulated communication device running firmware and interconnected with the virtual processor. The computer system is having a memory comprising separate memory portions allocated to the two or more virtual platforms. The method comprises, a driver running on the virtual processor, initiating a first virtual platform to transfer a data packet to one or more further virtual platforms. The transfer is performed by firmware running on the simulated communication device in the first virtual platform. The method comprises copying a data packet, by the firmware on the first virtual platform, from the memory portion allocated to the first virtual platform to a shared device memory, where the shared device memory is a predefined range of addresses of a memory portion allocated to one of the virtual platform, the shared device memory being accessible by all the virtual platforms. The method also comprises indicating the transfer of data packet to those virtual platforms to which the packet is transferred.

Optionally, copying a data packet from the memory portion allocated to the first virtual platform to a shared device memory includes copying the data packet to a data portion in the shared device memory, where the data portion is visible to the two or more virtual platforms.

Optionally, indicating the transfer of data packet is performed by writing a value into a register in a register portion in the shared device memory, where the register portion represents one or more registers allocated to each virtual platform.

Optionally, the method further comprises checking the registers allocated to each virtual platform in every simulated clock cycle. The checking is performed by simulated communication device. The method comprises raising an interrupt to the corresponding virtual platform, on identifying a value written in a register allocated to that virtual platform, wherein the interrupt is raised by the firmware running on the simulated communication device in that virtual platform. The method further comprises reading the data packet from the data portion of the shared device memory by the simulated communication of the corresponding virtual platform on receiving an interrupt and acknowledging the interrupt by writing a value into another register allocated by the virtual platform.

Optionally, copying the data packet, by the firmware, from the memory portion allocated to the first virtual platform to a shared device memory occurs at a lower MAC layer in a communication protocol model of the simulated communication device.

Optionally, the method further comprises providing an output from the simulated communication to a debugger and analysing the output by the debugger, to verify if the communication between the two or more virtual platforms was successful and outputting a corresponding indication.

Optionally, the method further comprises modifying the functioning of the simulated communication device to correct any error in the communication between the two or more virtual platforms based on the indication from the debugger.

Optionally, the method further comprises designing an integrated circuit hardware implementation of the simulated communication device based on the indication from the debugger.

According to a third aspect there is provided a computer readable code configured to cause the method according to the second aspect to be performed when the code is run.

According to a fourth aspect there is provided a computer readable storage medium having encoded thereon the computer readable code according to the third aspect.

The hardware implementation of the simulated communication device may be embodied in hardware on an integrated circuit. There may be provided a method of manufacturing, at an integrated circuit manufacturing system, a hardware implementation of the simulated communication device. There may be provided an integrated circuit definition dataset that, when processed in an integrated circuit manufacturing system, configures the system to manufacture a hardware implementation of the simulated communication device. There may be provided a non-transitory computer readable storage medium having stored thereon a computer readable description of a hardware implementation of the simulated communication device that, when processed in an integrated circuit manufacturing system, causes the integrated circuit manufacturing system to manufacture an integrated circuit embodying a hardware implementation of the simulated communication device.

There may be provided an integrated circuit manufacturing system comprising: a non-transitory computer readable storage medium having stored thereon a computer readable description of the hardware implementation of the simulated communication device; a layout processing system configured to process the computer readable description so as to generate a circuit layout description of an integrated circuit embodying the hardware implementation of the simulated communication device; and an integrated circuit generation system configured to manufacture the hardware implementation of the simulated communication device according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
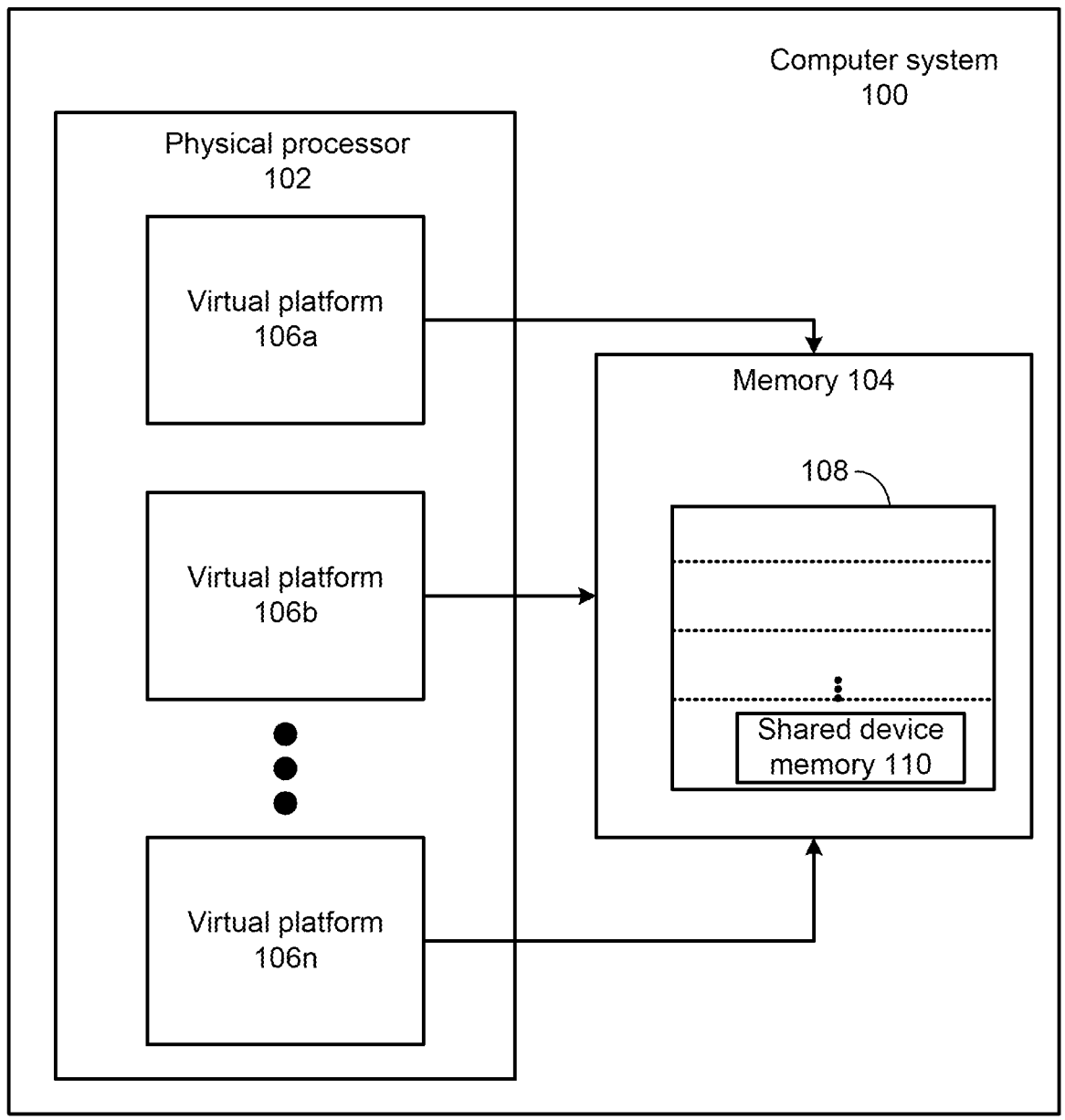
FIG. 1 is a block diagram of an example of a computer system running two or more virtual platforms.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented byway of example to enable a person skilled in the art to make and use the invention. The present invention is not limited to the embodiments described herein and various modifications to the disclosed embodiments will be apparent to those skilled in the art.

Embodiments will now be described by way of example only.

As discussed earlier, virtual platforms enable system developers to overcome significant challenges such as testing, developing, debugging, and maintaining various complex electronic systems. Virtual platforms are software devices that can fully mirror the functionality of a System-on-Chip (SoC). The virtual platforms may comprise high-speed processor simulators and device models that simulate the behaviour of an actual hardware device. There are different types of Virtual Platforms, those that are targeted as being close representations of the hardware and those that are targeted for major software development. A virtual platform supports software simulation of different hardware components, allowing software targeting particular hardware to be run and debugged unmodified in a purely software-simulated environment. Examples of when this is useful include when the hardware is only available in limited quantities, or is still under development. Hence the virtual platform can act as a substitute for the actual hardware device enabling a system developer to control, monitor or analyse the simulated hardware device. However, in the case of testing and debugging of electronic systems such as communication systems, there is a need to enable communication between different virtual platforms to test the communication.

Some electronic systems (such as computer devices) are capable of running/hosting multiple virtual platforms on the same hardware platform. Each virtual platform is one or more self-contained process run by an operating system in a physical processor in such a system. That means a virtual platform is a piece of software operating in their own address space. Thus, two different virtual platforms operate on two separate address spaces and one virtual platform is not capable of accessing the data in the address space of another virtual platform. There are various predefined mechanisms or ways for enabling communication between different virtual platforms. Some of such mechanisms include pipes, shared files, and shared memory. Piping is a mechanism for inter-process communication using message passing. The mechanism of the pipes is a traditional way in which a set of processes are chained together such that text can be passed between them though a file-like interface. The mechanism of shared files is where two processes synchronize their access to a single file in the filesystem.

Similarly, the shared memory is a mechanism for inter-process communication (IPC), i.e. a way of exchanging data (between programs such as virtual platforms) running on a physical processor at the same time. Shared memory enables sharing a portion or a part of physical memory (of the electronic system running the virtual platforms) across the virtual platforms or within a virtual platform. In an implementation, the process may create an area in the memory (such as RAM) which other processes can access. In another implementation shared memory is a method of conserving memory space by directing accesses to copies of a piece of data to a single instance instead, by using virtual memory mappings. This second implementation is most often used for shared libraries and for Execute in Place (XIP).

Shared memory is a faster way of enabling communication between processes such as virtual machines compared to piping and shared files as the processes can access the shared memory area like regular working memory. There is almost no computational overhead while using shared memory. Further, the shared memory enables maximum efficient utilization of the resources (such as available physical memory) of the device.

On the other hand, communication using shared memory is less scalable, as for example the communicating processes must be running on the same electronic system and care must be taken to avoid potential conflict if processes sharing memory are running on separate processors and the underlying architecture is not cache coherent. While using shared memory, one of the processes (a first virtual platform) tries to communicate with another process (a second virtual platform) by writing data into the shared memory. However, there are no mechanisms to synchronize the communication between the first and second virtual platforms using the shared memory. Therefore, yet another process (a third virtual platform) capable of accessing the shared memory may overwrite the data written by the first virtual platform. Thus, integrity or protection of data is affected while communicating via the shared memory.

The inventors have devised a method of utilizing a shared memory-based mechanism efficiently to achieve faster communication between the virtual platforms without compromising the security and integrity of the data transferred. The inventors formulated that by using a dedicated address space of a memory allocated to a simulated device as a shared memory it is possible to perform secure transactions between multiple virtual platforms. The shared memory allocated to the simulated device is referred to as shared device memory. Further, separating the shared device memory in a particular manner into different portions and using one for transferring the data and the other for synchronizing the communication, the shared device memory can be efficiently used for communication between virtual platforms. The detailed explanation of how this is achieved is provided below with reference to the description of the figures.

FIG. 1 illustrates a block diagram of a computer system 100 running a plurality of virtual platforms (processes). The computer system 100 comprises a physical processor 102 and a physical memory 104. The computer system may in some examples include one or more physical processors or one or more physical memories.

The physical processor 102 may be a microprocessor, controller, or any other suitable type of processor for processing computer executable instructions to control the operation of the computer system 100. Examples of the physical processor 102 include, but are not limited to, an x86 processor, a RISC-V® processor or an ARM® processor. The physical processor 102 runs one or more host operating systems dictating tasks to the physical processor. The host operating system could be any operating system such as, but not limited to, Linux or Windows.

The physical processor 102 is coupled to a physical memory 104. In some examples, the physical processor may be coupled to one or more physical memories. The memory may be implemented using any suitable type of memory such as, but not limited to, Random Access Memory (RAM), Flash, or any other physical memory modules.

The physical processor 102 runs or executes two or more virtual platforms 106a, 106b . . . 106n. Each virtual platform simulates or virtualizes the behaviour of an actual electronic device. Though virtual platforms can be used for simulating, testing, and debugging different types of electronic devices, in the examples described herein, the virtual platforms are considered to simulate the behaviour of actual communication devices. This comprises simulating devices such as Wi-Fi® devices, wired ethernet or Bluetooth® devices, or other communication device hardware.

The physical memory 104 may comprise a plurality of memory portions 108. Each virtual platform (process) is allocated at least one separate, non-overlapping, memory portion (i.e. address spaces) from the plurality of memory portions 108. Thus, each virtual platform runs in parallel without interrupting each other. Each virtual platform, as discussed above are one or more stand-alone self-contained processes, not interacting with each other. One virtual platform cannot access the memory portions allocated to the other virtual platforms. Thus, to make the virtual platforms to communicate with each other, a dedicated method of communication needs to be established.

The two or more virtual platforms 106a, 106b . . . 106n herein are made to communicate with each other using a shared memory-based mechanism. The two or more virtual platforms 106a, 106b . . . 106n as shown in FIG. 1 are coupled to the physical memory 104 of the computer system 100. Separate memory portions of the physical memory 104 are allocated to each virtual platform. A predefined address space of a memory portion allocated to one of the virtual platforms is assigned as the shared device memory 110 for enabling communication via a shared memory-based mechanism.

In an example, the two or more virtual platforms running on computer system 100 may be implemented to test the communication between two or more communication devices. The computer system 100 may be configured to simulate one to one, or one to many communication between the two or more communication devices, thereby testing and debugging the transmission and reception of signals (data packets) between two or more communication devices and the functioning of various parts of the communication devices.

Figure 2:
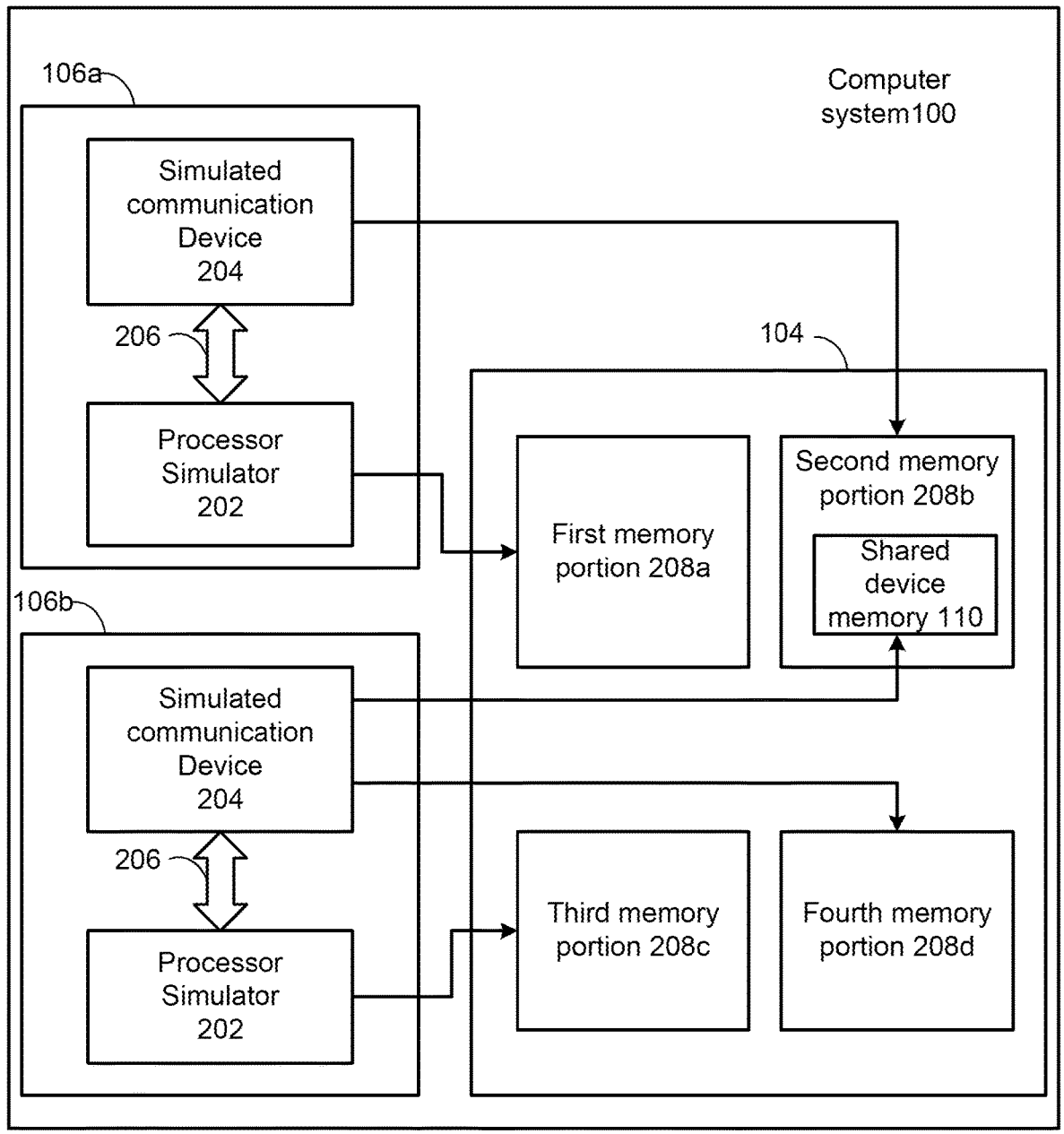
FIG. 2 is a block diagram of an example of a computer system running two or more virtual platforms coupled to separate memory portions of the memory.

The detailed explanation of virtual platforms, as well as interconnections between the virtual platforms and the memory 104, are explained with reference to FIG. 2. FIG. 2 is a block diagram of an example of a computer system 100 running two virtual platforms.

FIG. 2 illustrates two virtual platforms (processes) 106a and 106b running on the physical processor of the computer system. As explained with reference to FIG. 1, there can be two or more virtual platforms running on the computer system 100 at the same time.

Each virtual platform comprises a processor simulator 202, a simulated communication device 204, and an interface 206. The processor simulator 202 is a piece of software simulating the behaviour of an actual physical processor. The processor simulator 202, in each virtual platform, simulates a virtual processor thereby enabling the virtualization of an actual physical processor. The processor simulator may be any suitable simulator including, but not limited to, Quick Emulator (QEMU) or gem5. The processor simulators such as QEMU execute one or more virtual processors in parallel. The processor simulators can interface with many types of physical host hardware, including the hard disks or physical memory, CD-ROM drives, network cards, audio interfaces, and USB devices.

The virtual processor simulated by the processor simulator 202 may be of the same type or different type of processor compared to the physical processor 102. In an example, consider the physical processor 102 is an x86 processor. The virtual processor simulated could be an ARM® processor, RISC-V® processor, MIPS® processor, or even a different x86 processor.

The processor simulator 202 simulates the virtual processors and enables them to run a variety of guest operating systems. The processor simulator may run none, one or more than one guest operating system on the virtual processor. The guest operating system may be any suitable operating system such as, but not limited to, Windows or Linux. The guest operating systems may be same as the host operating system running on the physical processor or may be different from the host operating system.

The processor simulator 202 on different virtual platform could be a different type of processor simulator. Further, the processor simulator on different virtual platforms could simulate the same or different virtual processors executing same or different operating systems.

Each virtual platform further comprises a simulated communication device 204 simulated by a device simulator. In some examples, there could be more than one simulated communication device on a virtual platform. The simulated communication device may be the simulation of any type of communication device hardware, as discussed earlier, including but not limited to, Wi-Fi®, wired ethernet, or Bluetooth®. To simulate a communication device, the device simulator may simulate dedicated hardware of the communication device and run a plurality of lines of code developed for the corresponding hardware on a further simulated processor. This simulated processor is different from the virtual processor simulated by the processor simulator 202. In an example, device simulator may be a Radio Processing Unit (RPU) simulator simulating an RPU having a MIPS processor, and using a TCP/IP communication protocol for communication.

The simulated communication device 204 is further configured to run firmware on the simulated processor associated with the simulated communication device. The firmware is a set of instructions running on a device that provides low-level control of that device. The firmware running on the simulated communication device uses the shared device memory 110 to enable communication between a virtual platform and at least one other virtual platform running on the computer system 100. That is, the firmware interacts with the simulated communication device to transmit or receive a signal (or a data packet).

In the example shown in FIG. 2, the simulated communication device 204 is not running as stand-alone executable code. The simulated communication device is run as a shared library that interacts with the processor simulator 202 through an interface 206. The interface may be any type of suitable interface, such as but not limited to, Peripheral Component Interconnect express (PCIe), Memory-Mapped Input/Output, (MMIO), Port Mapped Input/output (PMIO), or USB.

The simulated communication device 204 when connected to the processor simulator 202 via the interface behaves like an actual communication device. The processor simulator 202 further executes a device driver on the virtual processor and the device driver drives the simulated communication device to communicate with the simulated communication devices on other virtual platforms. Thus, the virtual processor behaves as an actual processor with an operating system on which a final embedded system of a device driver of an actual communication device hardware is expected to run. The virtual platform thus simulates or creates the virtualization of a preferable actual hardware processor with simulations of one or more devices mapped on it that represents a final device on silicon.

Further, as shown in FIG. 2, the virtual processor simulated by the processor simulator 202 and the simulated communication device 204 in each virtual platform is coupled to separate memory portions in the physical memory 104. The processor simulator 202 allocates a portion of the physical memory to the virtual processor. Thus, the virtual processor behaves like an actual processor coupled to an actual memory. Similarly, the device simulator executing the simulated communication device allocates another portion of the physical memory to the simulated communication device 204 (i.e. to the processor associated with the communication device 204).

The physical memory 104 may be partitioned into a plurality of memory portions. Each memory portion represents a subset of the total memory. The multiple memory portions may be of the same size or may be different sizes. The memory portions may form a contiguous block of memory; or the memory portions may be separated from each other by other memory modules or components. In the example shown in FIG. 2, the memory 104 is divided into multiple memory portions that are separate from each other. However, it will be evident to a person of skill in the art that this is an example only and that the memory 104 may not be divided or may be divided into more or fewer memory blocks and may be contiguous.

In the example shown in FIG. 2, a first virtual processor run by the processor simulator 202 in a first virtual platform 106a is coupled to a first memory portion 208a in the memory 104. The simulated communication device 204 in the first virtual platform 106a is coupled to a second memory portion 208b. Further, a second virtual processor run by the processor simulator 202 in a second virtual platform 106b is coupled to a third portion 208c and the simulated communication device 204 in the second virtual platform 106b is coupled to a fourth memory portion 208d. This is an example, and the computer system may have n number of virtual platforms, with the virtual processor and the simulated communication device in each virtual platform allocated with separate memory portions in the physical memory 104. In other words, each virtual platform is configured to access separate memory portions of the physical memory 104 of the computer system 100.

A predefined range of addresses of a memory portion allocated to at least one of the virtual platforms is configured as a shared device memory 110 to enable communication between the two or more virtual platforms through shared memory-based mechanism.

More specifically, shared device memory 110 is configured as a predefined range of addresses of a memory portion allocated to a simulated communication device in a virtual platform. There may be more than one shared device memory configured between two or more communication devices. The virtual platform whose allocated memory portion is configured as the shared device memory is assigned the responsibilities to manage, update, or delete the shared device memory. The shared device memory thus configured is visible to other virtual platforms among the two or more virtual platforms. These other virtual platforms are capable of reading from and writing into the shared device memory. The detailed explanation of the shared device memory 110 is explained in detail with respect to FIG. 3.

In the example in FIG. 2, the predefined range of addresses of the second memory portion 208b allocated to the simulated communication device 204 in the first virtual platform 106a is configured as a shared device memory 110. As shown in FIG. 2, the shared device memory 110 is also accessible by the second virtual platform 106b. More specifically, the shared device memory is accessible by the simulated communication device 204 in the second virtual platform 106b. Similarly, when there are two or more virtual platforms executing on the computer system 100, the shared device memory is configured to be accessible by the simulated communication devices on each of the virtual platforms.

Figure 3:
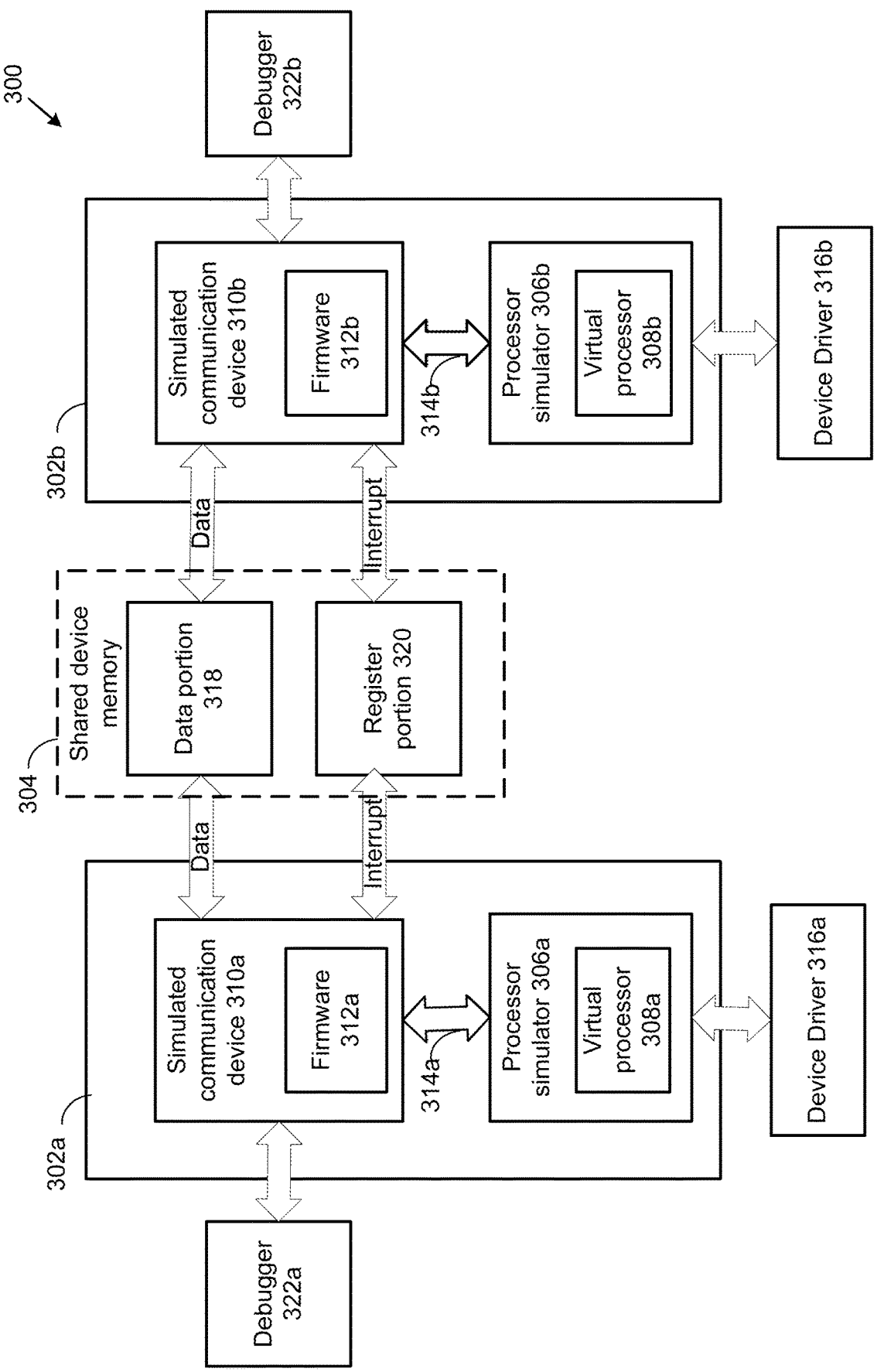
FIG. 3 is a block diagram of an example of a computer system with two virtual platforms communicating with each other via a shared memory-based mechanism.

The computer system enabling communication between the two or more virtual platforms is explained in detail with reference to FIG. 3. For simplicity, FIG. 3 illustrates only two virtual platforms 302a and 302b interconnected to each other through a shared device memory 304. The two virtual platforms 302a and 302b corresponds to the virtual platforms described in FIGS. 1 and 2. The two virtual platforms 302a and 302b as discussed in the above paragraphs, run on the physical processor of the computer system 300.

As described above, each virtual platform comprises a virtual processor (308a, 308b) (simulated by a processor simulator (306a, 306b)) and a simulated communication device (310a, 310b) having a processor running firmware (312a, 312b). In each virtual platform, the processor simulator is interconnected to the simulated communication device through a standard interface (314a, 314b). Each virtual processor runs a device driver (316a, 316b) through an interface. The device driver is a computer program that drives the simulated communication device that is connected to the virtual processor. The device driver provides a software interface to hardware devices, enabling operating systems and other computer programs to access hardware functions without needing to know precise details about the hardware being used.

The device driver communicates with the simulated communication device via the interface (314a, 314b). The device driver interacts with the firmware to drive the firmware to initiate the corresponding simulated communication device to communicate with simulated communication devices in the other virtual platforms. The device driver is software specifically configured to interact with and control a transmitter/receiver in a communication device. The device drivers usually provide the interrupt handling required for any necessary asynchronous time-dependent hardware interface.

Further, as described above, the two virtual platforms are configured to access separate portions of the physical memory of the computer system 300. The physical memory comprises predefined addresses of a memory portion configured as shared device memory 304 (configured as the shared device memory 110 defined in FIG. 1 and FIG. 2) accessible by both virtual platforms. In the example shown in FIG. 3, consider that the predefined address of a part of the memory portion allocated to the simulated communication device 310a in the first virtual platform 302a is configured as a shared device memory 304, such that the shared device memory 304 is visible to both the virtual platforms (302a and 302b).

The shared device memory 304 may be further arbitrarily partitioned into a data portion 318 and a register portion 320. The data portion 318 in the shared device memory is configured such that it is accessible by the two or more virtual platforms running on the computer system. The data portion 318 is configured for transferring data between the virtual platforms. The virtual platforms are enabled to transfer the data into the data portion or access data from the data portion while communicating with each other. The register portion 320 comprises a plurality of registers. The simulated communication device in each virtual platform is allocated one or more registers among the plurality of registers. The register portion 320 is used for synchronizing the communication between the virtual platforms. The register portion 302 is a region or portion of the shared device memory 304 configured to enable the simulated communication devices in the virtual platforms to send signals, interrupts, and/or other information to other virtual platforms.

The method of enabling communication between the virtual platforms 302a and 302b are explained in detail below. Consider in an example, the first virtual platform 302a is transmitting a data packet to the second virtual platform 302b. The communication can happen in the either direction. In other examples, a virtual platform may transmit the data packet to multiple other virtual platforms at the same time.

When the first virtual platform 302a communicates with the second virtual platform 302b, the device driver 316a running on the virtual processor 308a initiates the first virtual platform 302a to transfer a data packet to the second virtual platform 302b. The device driver 316a interacts with the firmware 312a running on the simulated processor associated with the simulated communication device 310a in the first virtual platform 302a and drives the firmware 312a to interact with the simulated communication device 310a to initiate a transmission (transfer of a data packet).

The transfer is performed by copying the data packet from a memory portion allocated to the first virtual platform 302a to the shared device memory 320. More specifically, firmware 312a copies the data packet from the memory portion allocated to the simulated communication device 310a to the data portion 318 in the shared device memory visible to the second virtual platform 302b.

Further, the communication between the first virtual platform 302a and the second virtual platform 302b may be synchronized using the register portion 320 of the shared device memory. As discussed, one or more registers in the register portion 320 is allocated to each virtual platform. The one or more registers allocated to a virtual platform is mapped to the simulated processor associated with the communication device. The one or more registers allocated to each virtual platform is monitored by the corresponding virtual platform in every simulated clock cycle to decide whether any action needs to be performed. For example, the simulated communication device in each virtual platform polls for any interrupt. The one or more register is configured to indicate/trigger a virtual platform to access a transferred data packet.

The first virtual platform 302a triggers the second virtual platform 302b to access a data packet sent to it. This is performed, by the firmware 312a causing the simulated processor of the first virtual platform 302a to write a value into one or more registers allocated to the simulated communication device 310b to indicate that the data packet is stored in the data portion 318 and ready to be transferred to the second virtual platform 302b. In an example, the firmware 312a writes a non-zero value to one or more registers allocated to the simulated communication device 310b.

The communication between the virtual platforms can be synchronized using different methods based on the communication device or the simulated processor. An example method of synchronising the communication using the register portion by writing into one or more registers is explained with reference to FIG. 6 and based on the table 1 given below.

TABLE 1

| Name of register | Address | Details |
| --- | --- | --- |
| VP_INDEX | D1_1000 | Returns the index for the running virtual platform. |
| VP_INT_STATUS[1 . . . n] | D1_1004 + [(n − 1) × 8] | Writing any non-zero value to this register raises an external interrupt on virtual platform [1 . . . n]. |
| VP_INT_ACK[1 . . . n] | D1_1008 + [(n − 1) × 8] | Writing any non-zero value to this register clears associated external interrupt status |

In the example in Table 1, consider that the register portion is allocated address space from D1_1000 to D1_1100. D1 indicates that the address space is a part of the memory portion allocated to the simulated communication device of a first virtual platform 302a. The address D1_1000 indicates that the register portion starts from the memory address 1000 in the memory portion allocated to the simulated communication device. However, in other examples, the shared device memory and therefore the register portion can be a part of a memory portion allocated to a simulated communication device in any other virtual platform running on the computer system.

Each virtual platform running on the computer system checks their allocated registers in every simulated clock cycle. The simulated clock cycle is the time taken by the simulated processor to complete the execution of an instruction. In the example provided in Table 1, three registers are allocated to each virtual platform. In some other examples, any number of registers in the register portion can be allocated to each virtual platform.

A first register allocated to each virtual platform is an index register (VP_INDEX) providing the index value of each virtual platform running on the computer system. This is shown in the first row of Table 1. The VP_INDEX register allocated to each virtual platform may in actual hardware may occur at different addresses. The value of VP_INDEX allocated to each virtual platform, identifies each virtual platform as a first virtual platform or a second virtual platform and so on. In the simulated virtual platforms, the VP_INDEX may be a single register allocated to each virtual platform at an address D1_1000. In that case, the VP_INDEX would be programmed to return different values to each virtual platform when the virtual platform reads the VP_INDEX register. When each virtual platform checks the register VP_INDEX, the register returns an index value to the corresponding virtual platform. When the first virtual platform checks the VP_INDEX, the register returns an index value for the first virtual platform, which identifies it as the first virtual platform. Similarly, the second running virtual platform is returned a VP_INDEX value identifying it as the second virtual platform.

A second register allocated to each virtual platform is an interrupt status register (VP_INT_STATUS[1 . . . n]), which provides an interrupt status to each virtual platform. In Table 1, the VP_INT_STATUS[1 . . . n] for the two or more virtual platform (n virtual platforms) occurs at different addresses. The register VP_INT_STATUS1 for the first virtual platform is given as the address D1_1004 (i.e. D1_1004+(0x8)). Similarly, for the second virtual platform, the VP_INT_STATUS2 would occur at the address D1_1012 (i.e. D1_1004+(1x8)). Any value written into the VP_INT_STATUS raises an interrupt to the corresponding virtual platform. In an example a non-zero value is written into the register VP_INT_STATUS to raises an interrupt to the corresponding virtual platform.

A third register allocated to each virtual platform is an acknowledge register (VP_INT_ACK[1 . . . n]). When an interrupt is received by a virtual platform, the virtual platform acknowledges the interrupt by writing back into the register VP_INT_ACK[1 . . . n]. The first virtual platform is allocated with a VP_INT_ACK1 register at an address D1_1008 (i.e. D1_1008+(0x8)). The first virtual platform acknowledges an interrupt raised to it by writing back into VP_INT_ACK1 register at address D1_1008. The second virtual platform is allocated with VP_INT_ACK2 at address D1_1016 and a third virtual platform is allocated with VP_INT_ACK3 at address D1_1024, and so on.

Figure 6:
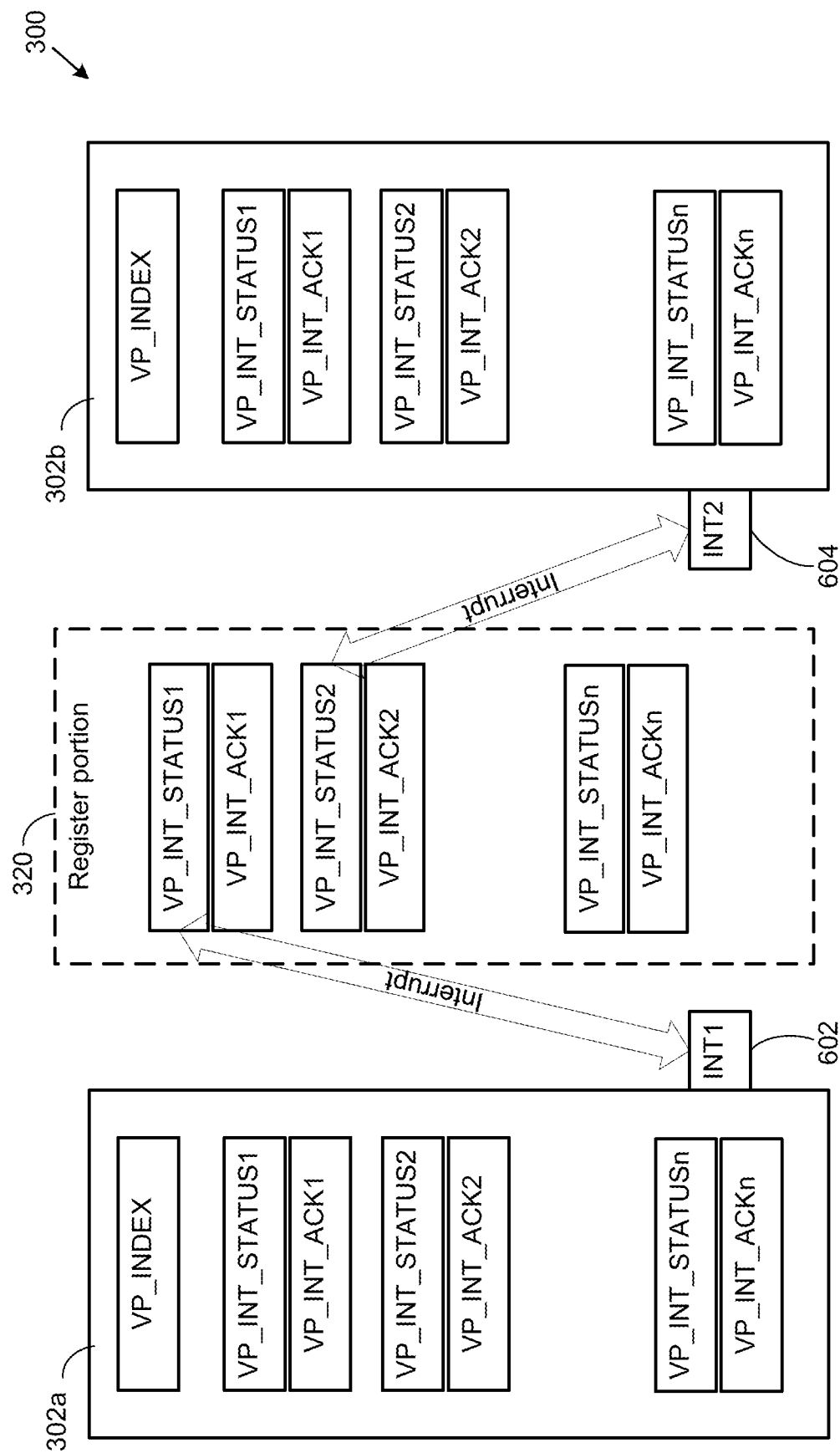
FIG. 6 is a block diagram of an example of a computer system with two virtual platforms communicating with each other via a shared device memory.

FIG. 6 illustrates the above mentioned registers allocated to the virtual platforms. In FIG. 6, the first virtual platform 302a is allocated with a VP_INDEX1 register which identifies it as the first virtual platform. Similarly, the second virtual platform 302b is allocated with a VP_INDEX2 register which identifies it as the second virtual platform. As mentioned above in a simulated virtual platform (unlike in the actual hardware) the VP_INDEX register could also be a single register in the register portion allocated to each virtual platform which is programmed such that the VP_INDEX return a different values to each virtual platform. FIG. 6 shows the interrupt status registers (VP_INT_STATUS [1 . . . n]) and acknowledge registers (VP_INT_ACK[1 . . . n]) as a part of the register portion 320. The same set registers are also shown in the first virtual platform 302a and the second virtual platform 302b because these registers are visible to each virtual platform.

The example shown in FIG. 6 illustrates an example method of synchronizing the communication between the first virtual platform and the second virtual platform on the computer system 300 in FIG. 3. The simulated communication device in the first and second virtual platforms checks the allocated registers in every simulated clock cycle. As discussed in the above paragraphs, when the simulated communication device 310a polls the allocated register in a simulated clock cycle, the register VP_INDEX returns an index value to the simulated communication device 310a indicating it as the first virtual platform. Similarly, when the simulated communication device 310b polls the allocated register in a simulated clock cycle, the register VP_INDEX returns an index value to the simulated communication device 310b indicating it as the second virtual platform.

As discussed above, on transferring a data packet from the simulated communication device 310a in the first virtual platform 302a to the simulated communication device 310b in the second virtual platform 302b, the firmware 312a writes a value into the VP_INT_STATUS2 at address D1_1012 allocated to the simulated communication device 310b in the second virtual platform 302b to indicate the transfer.

The simulated communication device 310a writes the value to VP_INT_STATUS2 at address D1_1012. The simulated communication device 310b checks the VP_INT_STATUS2 during each simulated clock cycle. On identifying a value written in the VP_INT_STATUS2, the simulated communication device 310b raises an interrupt to the simulated processor of the simulated communication device 310b. The interrupt is raised at the interrupt pin INT2 604. The simulated processor in the simulated communication device 310b identifies the interrupt as an external interrupt and immediately takes the action based on the interrupt.

On receiving an interrupt by the simulated processor, the firmware 312b interacts with the simulated communication device 310b and accesses the data packet written the data portion 318 of the shared device memory 304. The firmware 312b running on the simulated processor acknowledges the raised interrupt by writing back into the register VP_INT_ACK2 at the address D1_1016 to clear the interrupt raised (i.e. the simulated processor in second communication device 310b).

The simulated communication device 310a may check the acknowledgement register allocated to the simulated communication device 310b after transferring the data to the second virtual platform. When the simulated communication device 310a identifies a value written to VP_INT_ACK2 at address D1_1016, the simulated processor in the simulated communication device 310a identifies that the transfer of the data is complete. The transmission is thus synchronized using the register portion 320.

The second virtual platform 302b is also capable of transmitting back a data packet in a similar manner using the shared memory-based mechanism to the first virtual platform 302a. In that case, the second virtual platform copies a data packet from the memory portion allocated to the simulated communication device 310b to the shared device memory 304 and writes a value into the register VP_INT_STATUS1 allocated to the first virtual platform 302a.

Writing the value to the allocated register VP_INT_STATUS1 by the second virtual platform 302b causes an interrupt to be raised. The simulated communication device 310a checks the VP_INT_STATUS1 during each simulated clock cycle. On identifying a value written in the VP_INT_STA- TUS1, the simulated communication device 310a raises an interrupt to the simulated processor of the simulated communication device 310a. The interrupt is raised at the interrupt pin INT1 602. The simulated processor in the simulated communication device 310a identifies the interrupt as an external interrupt and immediately takes the action based on the interrupt. On receiving an interrupt, the firmware 312a interacts with the simulated communication device 310a to access the data packet written in the shared device memory 304.

The simulated processor acknowledges the interrupt by writing back to the register VP_INT_ACK1 at address D1_1008 to acknowledge and clears the interrupt raised. The simulated communication device 310b checks the register VP_INT_ACK1 after transferring the data to the first virtual platform. When the simulated communication device 310b identifies a value written to VP_INT_ACK1 at address D1_1008, the simulated processor in the simulated communication device 310b would consider that the transfer of the data is complete. The transmission is thus synchronized using the register portion 320.

The communication protocol may determine the virtual platforms to which a particular (say first) virtual platform need to transfer the data. Further, if there are multiple virtual platforms running on the computer system 300, a virtual platform may be enabled to communicate with multiple other virtual platforms at the same time. Suppose there are four virtual platforms running on the computer system 300, and the first virtual platform is required to communicate with the second and fourth virtual platform. The device driver 316a interacts with the firmware 312a running on the simulated communication device 310a to transfer data packet to the second and fourth virtual platforms. The firmware 312a copies the data packet to the data portion 318 of the shared device memory 304. The firmware 312a further writes into the register VP_INT_STATUS2 and VP_INT_STATUS4 at addresses D1_1012 and D1_1028 respectively.

The simulated communication devices in the second virtual platform and the fourth virtual platform polls the allocated registers in the register portion 320 on every simulated clock cycle. When the second virtual platform checks the register VP_INDEX2 on a simulated clock cycle, the register returns a value identifying it as the second virtual platform. When the fourth virtual platform checks the register VP_INDEX4 on a simulated clock cycle, the register returns a value identifying it as the fourth virtual platform. Further, when the first virtual platform 302a writes into the corresponding allocated register VP_INT_STATUS2 and VP_INT_STATUS4 (at addresses D1_1012 and D1_1028), it causes an interrupt to be raised to corresponding simulated processors of the simulated communication device of the second virtual platform 302b and fourth virtual platform.

Thus, when an interrupt is raised to the simulated processor of the simulated communication device 310b, the simulated processor reads the transmitted data packet from the shared device memory 304. Similarly, when an interrupt is raised to the simulated processor of the simulated communication device on the fourth virtual platform, the is simulated processor reads the transmitted data packet from the shared device memory 304.

Further, the second virtual platform writes back to the register VP_INT_ACK2 at address D1_1016 to acknowledge the interrupt raised to the simulated processor of the simulated communication device 310b. Similarly, the fourth virtual platform writes back to the register VP_INT_ACK4 at address D1_1032 to acknowledge the interrupt raised to the simulated processor of its corresponding simulated communication device.

Thus, by allocating a predefined addresses of device memory (i.e. memory portion allocated to a simulated communication device in a virtual platform), it is possible to transfer the data packet efficiently and also synchronize the communication between virtual platforms, thereby making the communication much faster and reliable. The synchronization of the communication device eliminates the situation where other virtual platforms overwrites the shared device memory before transfer of data to another virtual platform.

The above described method in FIG. 6 is an example. However, it is evident that a person skilled in the art may use other methods for synchronising the transfer between two virtual platforms based on the type of the communication device and different modes of communication between them.

Further, the output of the computer system 300 can be obtained for verification, correction and development of actual hardware electronic device in order to modify or design the actual hardware before manufacturing. For example, the simulated communication device (310a, 310b) in a virtual platform may provide output (such as emitting log files) that can potentially capture every step during the execution, including memory transaction, PC fetch etc to a debugger (322a, 322b). The debugger analyses the output received from the simulated communication device to verify if the communication between two or more virtual platforms was successful and output a corresponding indication. The contents of the shared device memory depicting the communication between the virtual platforms may be received by a debugger (322a, 322b) connected to the simulated communication device (310a, 310b). The contents of the shared device memory 304 may be copied to a log folder and can be used to identify the errors in the transmission and reception. The debugger may be used to debug the errors occurring while transmission or reception of the data and output an indication. An example of the debugger is a Codescape™ debugger. The debugger may be used for various applications such as IP evaluation, SoC design, driver development, application development, or code optimization. The debugger may be capable of performing step debugging, memory view and all the standard debugging capabilities.

Thus, based on the indication from the debugger, the functioning of the simulated communication device is modified to correct any errors in communication. Further, the necessary modifications are made to the design of the simulated communication device to make the device work correctly and efficiently before implementing the actual communication device on a SoC.

Further, the device driver and the firmware are identical to those deployed on the actual device hardware and hence the simulations are accurate for testing the real software of the device driver and the firmware.

The transfer of data packet from the memory portion allocated to the simulated communication device to the shared device memory is explained in detail with reference to FIG. 4. The simulated communication device, as discussed in the above paragraphs, is the simulation of any communication device hardware such as Wi-Fi®, wired ethernet, or Bluetooth. Specifically, simulation of communication device hardware is the simulation of the communication protocol used by the actual communication device. Different communication devices communicate using different communication protocols. Communication protocols such as IEEE, IETF, OSI or IP protocols define the rules and conventions for exchanging information between communication devices through a network or other media.

Communication devices typically use a set of cooperating protocols, sometimes called a protocol suite for communication. Some examples of protocol suites include but are not limited to Internet protocol suites TCP/IP, IPX/SPX, X.25, AX.25, and AppleTalk. The protocol suites provide end-to-end data communication specifying how data should be packetized, addressed, transmitted, routed, and received. This functionality is organized into different layers.

Figure 4:
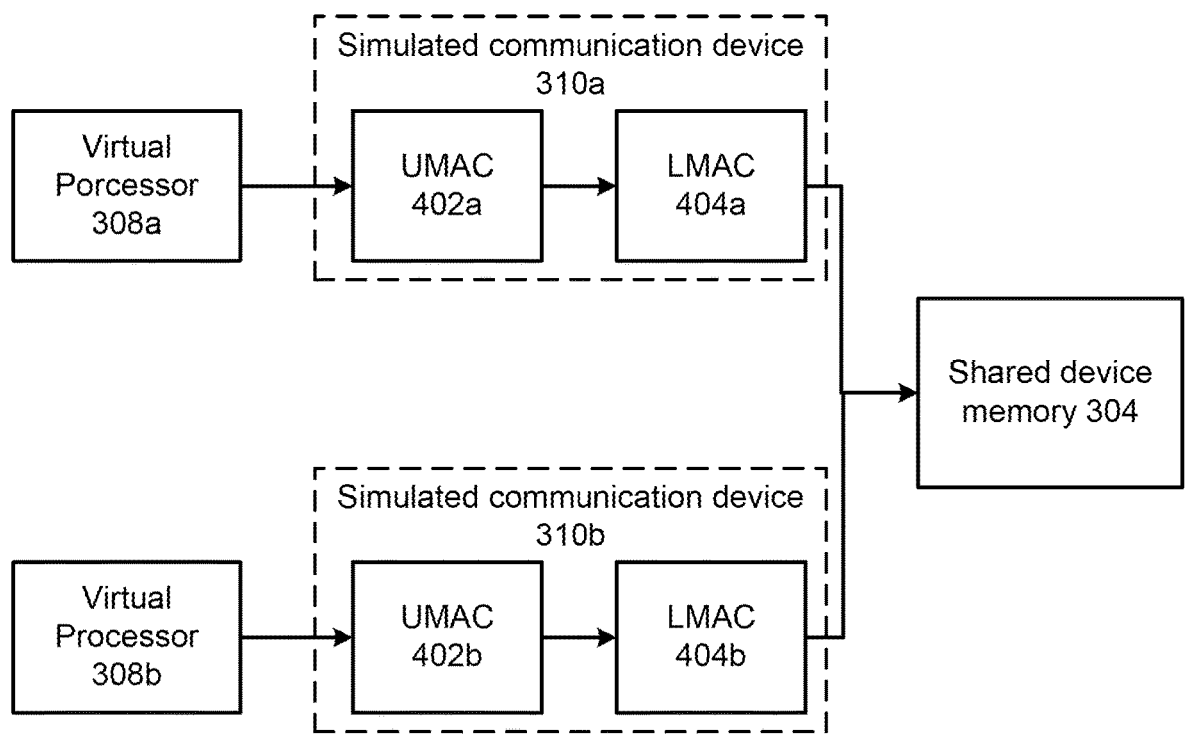
FIG. 4 is a block diagram of an example of a computer system with two virtual platforms communicating with each other at the MAC layer.

In the explanation provided with reference to FIG. 4, an example of a Wi-Fi® device communicating using TCP/IP protocol is described in detail. Although the methods and system are described herein as being used in a Wi-Fi® device, it will be appreciated that the methods may also be applied in other communication devices which operate using any communication protocol. The TCP/IP protocol has five layers. The layers include the link layer, containing communication methods for data that remains within a single network segment (link); the internet layer, providing internetworking between independent networks; the transport layer, handling host-to-host communication; and the application layer, providing process-to-process data exchange for applications.

The link layer is used to move packets between the Internet layer interfaces of two different hosts on the same link. The processes of transmitting and receiving packets on the link can be controlled both in the device driver for the network hardware, as well as in firmware or by specialized chipsets. These perform functions, such as framing, to prepare the Internet layer packets for transmission, and finally transmit the frames to the physical layer and over a transmission medium. The TCP/IP model includes specifications for translating the network addressing methods used in the Internet Protocol to link-layer addresses, such as media access control (MAC) addresses.

FIG. 4 depicts two virtual platforms connected at a MAC layer level. This is an example, and it is known to a person skilled in the art that communication can be enabled at any layer in the communication protocol. It is also possible to establish the communication at the physical layer. The MAC layer is further split into the upper MAC (UMAC) layer and the lower MAC (LMAC) layer.

In FIG. 4, the virtual platforms are interconnected to each other at an LMAC layer. The shared device memory bridges 304 the two LMAC layers (404*a*, and 404*b*) to allow communication between two simulated communication devices (310*a*, 310*b*). Since the communication devices are connected at the LMAC layer, the physical layer is not simulated. This reduces the complexity of simulating the simulated communication device.

As shown in FIG. 4, when a first virtual platform is to transfer a data packet to the second virtual platform, the device driver running on the simulated virtual processor 308*a* interacts with a firmware running on the simulated communication device 312*a*. The firmware interacts with the UMAC layer 402*a* regarding transmission of the data packet and the UMAC layer 402*a* in turn communicates with LMAC layer 404*a* regarding the transmission. The communication between the LMAC layer 404*a* and UMAC layer 402*a* remains unchanged. The UMAC layer 402*a* does not have any access to the shared device memory 304. Typically, in a TCP/IP model, the data packet is generally sent from the LMAC layer to the physical layer before transmission.

However, in this example, the transmission is enabled at the LMAC layer 404*a* of protocol. At the LMAC layer, the device can achieve zero error while transmitting a data packet. This is because the Internet layer packets are prepared as frames and are transmitted without any conversion. The device driver in the first virtual platform interacts with the firmware on the simulated communication device 310*a*, and the firmware interacts with the LMAC layer 404*a* to copy the data packet (signal), from the memory portion allocated to the simulated communication device 310*a* to the shared device memory 304. Further, the firmware writes into a shared register allocated to the simulated communication device 310*b*.

The simulated communication device 310*b* updates the shared registers in every simulated clock cycle. When a value is written into the shared register, an interrupt is raised to the simulated processor of the simulated communication device 310*b*. The simulated processor on receiving the interrupt, causes the firmware to interact with the LMAC layer 404*b* access the data packet from the shared device memory 304 and acknowledges the interrupt raised. The transmission at the LMAC layer can be achieved because the shared device memory 304 is a part of the memory allocated to the device rather than a common physical memory.

Figure 5A:
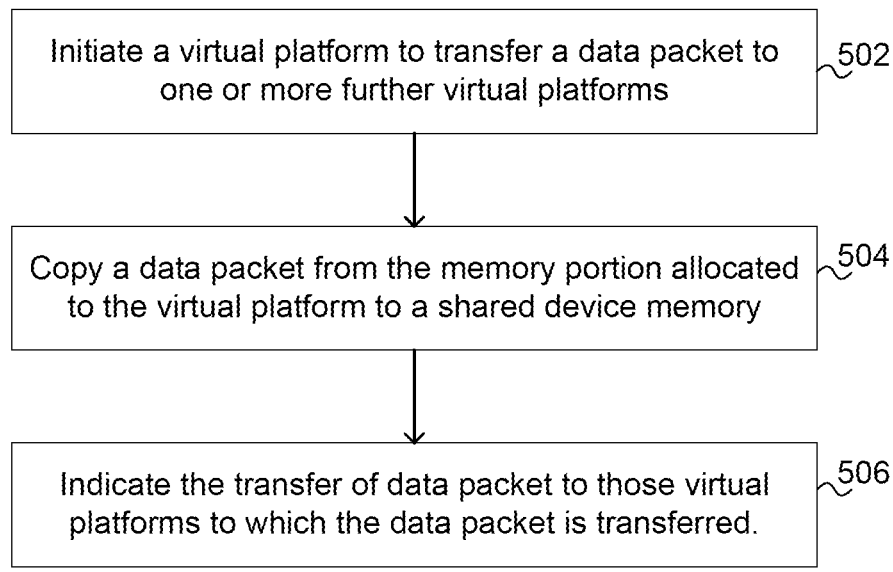
FIGS. 5*a* and 5*b* are flowcharts illustrating the transmission and reception of data packets between two or more virtual platforms.
Figure 5B:
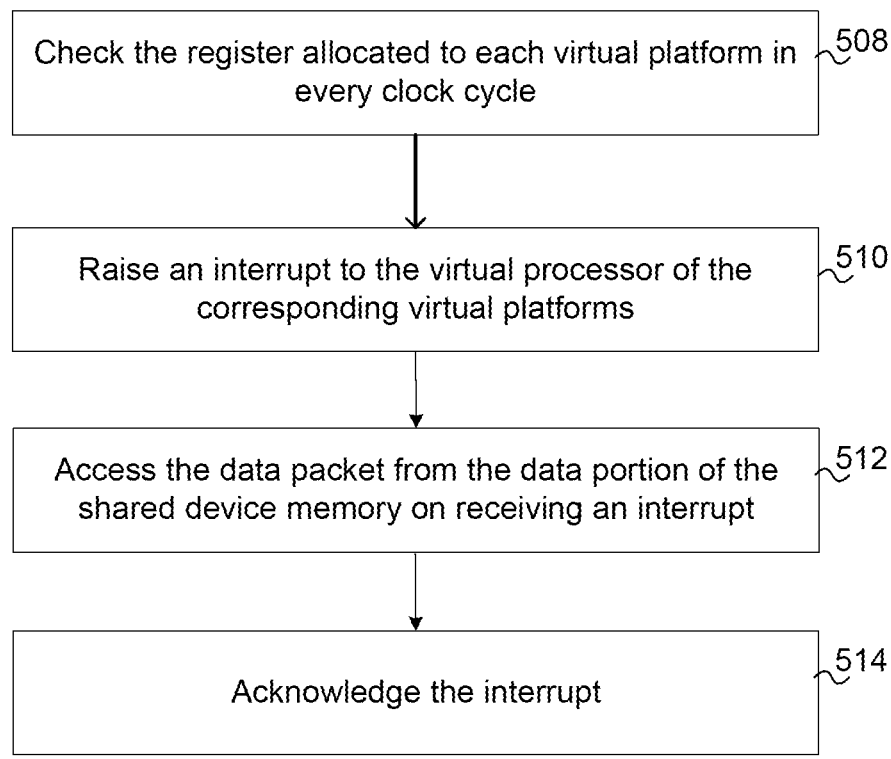

FIGS. 5*a* and 5*b* is a flowchart illustrating the method of enabling communication between two or more virtual platforms. FIG. 5*a* is a flowchart illustrating the transmission of a data packet from a virtual platform to one or more virtual platforms. The two or more virtual platforms discussed here are executed on a physical processor on a computer system. Each virtual platform among the two or more virtual platforms comprises a virtual processor simulated by a processor simulator and a simulated communication device simulated by a device simulator. Further, each virtual processor runs a device driver that drives the simulated communication device and each simulated communication device runs firmware controlling the operations of the corresponding simulated communication device. The processor simulator and the device simulator are interconnected by an interface. Further, the virtual processor and simulated communication device in each virtual platform are allocated separate memory portions of a physical memory of the computer system. A part of a memory portion allocated to one of the simulated communication devices is configured as a shared device memory to enable communication via a shared memory-based mechanism.

At step 502, the method initiates a virtual platform to transfer a data packet to one or more other virtual platforms. The transfer is initiated by the device driver running on the virtual processor of the virtual platform transmitting the data packet. The device driver is software specifically configured to interact with and control a transmitter/receiver in a communication device. The device driver interacts with the firmware, and the firmware interacts with the simulated communication device in the virtual platform to transmit (transfer) a data packet to one or more virtual platforms.

At step 504, the method includes copying a data packet from a memory portion allocated to the virtual platform to the data portion of the shared device memory. The data packet is copied from the memory portion allocated to the simulated communication device in the virtual platform to the data portion of the shared device memory. The shared device memory is a part of a memory portion allocated to one of the simulated communication devices. The shared device memory is visible to the two or more virtual platforms running on the computer system.

At step 506, the method includes notifying the communication by indicating the transfer of data packet to those virtual platforms to which the data packet is transferred. The transfer is indicated by the virtual platform writing into one or more registers allocated to the one or more virtual platforms to which the data packet is transferred. The shared device memory includes a register portion which comprises one or more registers allocated to the simulated communication device in each virtual platform. Writing a value into the one or more registers triggers further steps that synchronise the communication between the virtual platforms.

FIG. 5b is a flowchart illustrating the method of accessing a data packet by one or more virtual platforms to which a data packet is transmitted by a virtual platform. Each virtual platform among the two or more virtual platforms check the allocated registers in every simulated clock cycle (at step 508). As mention in step 506, the communication is notified by the virtual platform by writing a value into the allocated register. The one or more virtual platforms to which data packet is transferred, identifies that a data packet is transferred to it on reading a value written at least one of the registers allocated to it.

At step 510, for each virtual platform among the one or more virtual platforms to which the data packet is transferred, writing a value in the allocated registers, raises an interrupt to the simulated processor of the corresponding simulated communication devices. These interrupts, though raised internally, appears to the simulated processor as external interrupts.

Further, at step 512, the firmware, on the simulated communication device in each virtual platform among the one or more virtual platforms, accesses the data packet from the data portion of the shared device memory on receiving the interrupt.

At step 514, the firmware running on the processor of the simulated communication device further interacts with the simulated communication device to acknowledge the interrupt raised. The interrupt is acknowledged by each virtual platform by writing a value into another register allocated to the corresponding simulating communication device. The virtual platform which transferred the data packet may routinely check the registers allocated to those virtual platforms to which the data is transferred. The virtual platform, which transferred the data packet, on reading a value in the registers allocated to each virtual platform to which the data is transferred identifies that the communication to those virtual platforms as complete. Thus, the method enables and synchronises communication between two or more virtual platforms.

Figure 7:
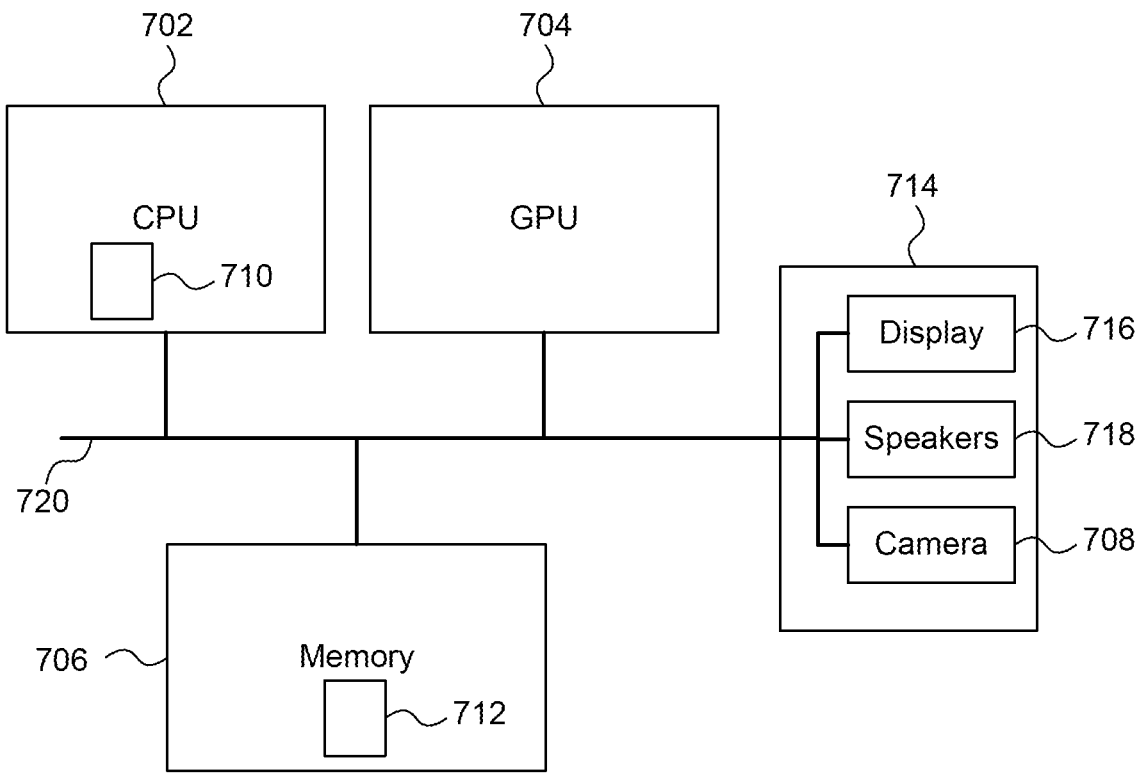
FIG. 7 shows a block diagram of a computer system.

FIG. 7 shows a system in which the computer system described herein may be implemented. The computer system comprises a CPU 702, a GPU 704, a memory 706 and other devices 714, such as a display 716, speakers 718 and a camera 708. A processing block 710 (corresponding to processing blocks in the computer system 100) is implemented on the CPU 702. In other examples, the processing block 710 may be implemented on the GPU 704. The components of the computer system can communicate with each other via a communications bus 720. A store 712 is implemented as part of the memory 706.

While FIG. 7 illustrates one implementation of a graphics processing system, it will be understood that a similar block diagram could be drawn for an artificial intelligence accelerator system—for example, by replacing either the CPU 702 or the GPU 704 with a Neural Network Accelerator (NNA), or by adding the NNA as an additional unit. In such cases, the processing block 710 can be implemented in the NNA.

The computer system described herein may be embodied in hardware on an integrated circuit. The computer system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation of the simulated communication device configured to perform any of the methods described herein, or to manufacture a hardware implementation of the simulated communication device comprising any apparatus described herein. An integrated circuit definition dataset may be, for example, an integrated circuit description.

Therefore, there may be provided a method of manufacturing, at an integrated circuit manufacturing system, a hardware implementation of the simulated communication device as described herein. Furthermore, there may be provided an integrated circuit definition dataset that, when processed in an integrated circuit manufacturing system, causes the method of manufacturing a hardware implementation of the simulated communication device to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of the simulated communication device will now be described with respect to FIG. 8.

Figure 8:
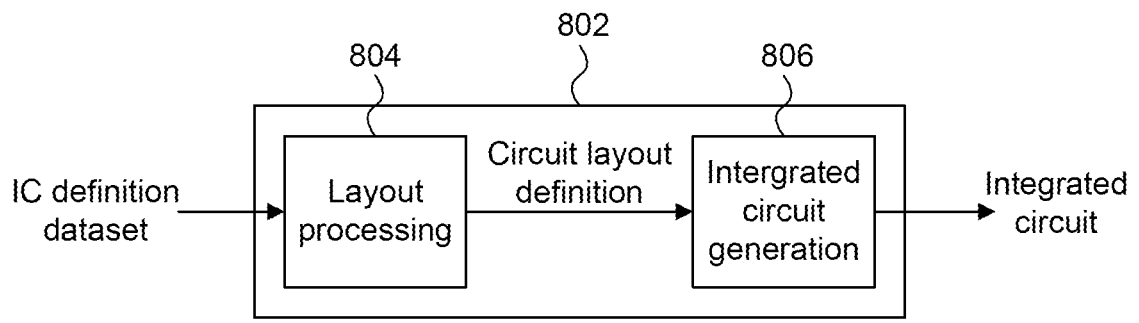
FIG. 8 shows an integrated circuit manufacturing system for generating an integrated circuit embodying a hardware implementation of the simulated communication device.

FIG. 8 shows an example of an integrated circuit (IC) manufacturing system 802 which is configured to manufacture a hardware implementation of the simulated communication device as described in any of the examples herein. In particular, the IC manufacturing system 802 comprises a layout processing system 804 and an integrated circuit generation system 806. The IC manufacturing system 802 is configured to receive an IC definition dataset (e.g. defining a hardware implementation of the simulated communication device as described in any of the examples herein), process the IC definition dataset, and generate an IC according to the IC definition dataset (e.g. which embodies a hardware implementation of the simulated communication device as described in any of the examples herein). The processing of the IC definition dataset configures the IC manufacturing system 802 to manufacture an integrated circuit embodying a hardware implementation of the simulated communication device as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of the simulated communication device without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A computer system configured to enable communication between two or more virtual platforms, the computer system comprising:
    a physical processor configured to run the two or more virtual platforms, the physical processor executing for each virtual platform:
    a processor simulator configured to simulate a virtual processor, wherein the virtual processor runs a device driver;
    a simulated communication device configured to run firmware, wherein the firmware initiates communication between its corresponding virtual platform and at least one other virtual platform; and
    an interface connecting the processor simulator with the simulated communication device such that the simulated virtual processor interacts with the simulated communication device; and
    a memory comprising one or more separate memory portions allocated to each of the two or more virtual platforms, wherein within at least one memory portion allocated to one of the virtual platform a predefined range of addresses is configured as a shared device memory, the shared device memory being accessible by all the virtual platforms and comprising:
        a data portion visible to the two or more virtual platforms; and
        a register portion representing a plurality of registers, wherein each virtual platform is allocated one or more registers in the register portion;
    wherein the firmware running on a first virtual platform is configured to transfer a data packet from the first virtual platform to one or more further virtual platforms via the shared device memory; and
    wherein the simulated communication device indicates the transfer of the data packet by writing into a register in the register portion allocated to each of the corresponding one or more virtual platforms to which data packet is transferred.

2. The computer system as claimed in claim 1, wherein the firmware transfers the data packet by copying the data packet from a memory portion allocated to the corresponding simulated communication device to the shared device memory.

3. The computer system as claimed in claim 1, wherein the virtual processor and the simulated communication device of each virtual platform are allocated separate memory portions in the memory.

4. The computer system as claimed in claim 1, wherein the shared device memory is configured as the predefined range of addresses of a memory portion allocated to a simulated communication device of one of the virtual platforms.

5. The computer system as claimed in claim 1, wherein the firmware running on the simulated communication device transfers the data packet by copying the data packet into the data portion in the shared device memory.

6. The computer system as claimed in claim 1, wherein each virtual platform among the two or more virtual platforms:
    checks the allocated registers in the register portion in each simulated clock cycle;
    raises an interrupt on the corresponding virtual platform, when a value is written in the allocated register;
    reads the data packet from the shared device memory; and
    acknowledges the interrupt by writing into another register in the register portion, allocated to the corresponding virtual platform.

7. The computer system as claimed in claim 6, wherein the firmware running on the simulated communication devices of the one or more virtual platforms reads the data packet from the shared device memory on receiving the interrupt.

8. The computer system as claimed in claim 1, wherein the simulated communication device comprises a simulated processor running the firmware.

9. The computer system as claimed in claim 8, wherein an interrupt is raised to and acknowledged by the simulated processor in the simulated communication device when a value is written into a register allocated to the virtual platform executing the simulated communication device.

10. The computer system as claimed in claim 1, wherein the device driver drives the firmware in the simulated communication device to initiate the communication.

11. The computer system as claimed claim 1, wherein the device driver interacts with and controls a transmitter and/or a receiver driver module.

12. The computer system as claimed in claim 1, wherein the simulated communication device further transfers an output to a debugger, wherein the debugger, on receiving the output, analyses the output to verify if the communication between the two or more virtual platforms was successful and outputs a corresponding indication.

13. The computer system as claimed in claim 1, wherein the simulated communication device is the simulation of a hardware communication device comprising at least one of Wi-Fi®, Bluetooth®, and wired ethernet.

14. The computer system as claimed in claim 1, wherein the simulated communication device is a simulation of dedicated hardware of a communication device running a plurality of layers of a communication protocol model on a simulated processor.

15. The computer system as claimed in claim 14, wherein the transfer of data packets is initiated at a lower MAC layer in the communication protocol model of the simulated communication device.

16. A computer-implemented method of enabling communication between two or more virtual platforms running on a physical processor of a computer system, the physical processor executing for each virtual platform a virtual processor and a simulated communication device running firmware and interconnected with the virtual processor, the computer system having a memory comprising separate memory portions allocated to the two or more virtual platforms, the method comprising:
- a driver running on the virtual processor initiating a first virtual platform to transfer a data packet to one or more further virtual platforms, wherein the transfer is performed by firmware running on the simulated communication device in the first virtual platform;
- copying a data packet, by the firmware on the first virtual platform, from the memory portion allocated to the first virtual platform to a shared device memory, where the shared device memory is a predefined range of addresses of a memory portion allocated to one of the virtual platform, the shared device memory being accessible by all the virtual platforms and comprising:
  - a data portion visible to the two or more virtual platforms; and
  - a register portion representing a plurality of registers, wherein each virtual platform is allocated one or more registers in the register portion; and
- indicating the transfer of data packet by writing a value into a register in the register portion allocated to each of those corresponding virtual platforms to which the packet is transferred.

17. The computer-implemented method as claimed in claim 16, wherein copying a data packet from the memory portion allocated to the first virtual platform to a shared device memory includes copying the data packet to a data portion in the shared device memory, where the data portion is visible to the two or more virtual platforms.

18. The computer-implemented method as claimed in claim 17, wherein the method further comprises:
- checking the registers allocated to each virtual platform in every simulated clock cycle, wherein the checking is performed by simulated communication device;
- raising an interrupt to the corresponding virtual platform, on identifying a value written in a register allocated to that virtual platform, wherein the interrupt is raised by the firmware running on the simulated communication device in that virtual platform;
- reading the data packet from the data portion of the shared device memory by the simulated communication of the corresponding virtual platform on receiving an interrupt; and
- acknowledging the interrupt by writing a value into another register allocated by the virtual platform.

19. The computer-implemented method as claimed in claim 16, wherein copying the data packet, by the firmware, from the memory portion allocated to the first virtual platform to a shared device memory occurs at a lower MAC layer in a communication protocol model of the simulated communication device.

20. The computer-implemented method as claimed in claim 16, wherein the method further comprises:
- providing an output from the simulated communication to a debugger; and
- analysing the output by the debugger, to verify if the communication between the two or more virtual platforms was successful and outputting a corresponding indication.

21. The computer-implemented method as claimed in claim 20, wherein the method further comprises:
- modifying the functioning of the simulated communication device to correct any error in the communication between the two or more virtual platforms based on the indication from the debugger.

22. The computer-implemented method as claimed in claim 21, wherein the method further comprises designing an integrated circuit hardware implementation of the simulated communication device based on the indication from the debugger.

23. A non-transient computer readable storage medium having encoded thereon a computer readable code configured to cause the method of claim 16 to be performed when the code is run.

* * * * *